US005609250A

United States Patent [19]
Moser

[11] Patent Number: 5,609,250
[45] Date of Patent: Mar. 11, 1997

[54] BOOK-STYLE CASSETTE HOLDER WITH STAY-FLAT SPINE PORTION

[75] Inventor: Robert E. Moser, Cape Girardeau, Mo.

[73] Assignee: Blair Industries Incorporated, Des Plaines, Ill.

[21] Appl. No.: 498,686

[22] Filed: Jul. 3, 1995

[51] Int. Cl.$^6$ .................................................. B65D 85/672
[52] U.S. Cl. .................... 206/387.13; 206/312; 206/472; 220/339
[58] Field of Search .................... 206/387.13, 387.1, 206/307, 472, 474, 475, 312; 220/339

[56] References Cited

U.S. PATENT DOCUMENTS

| | | | |
|---|---|---|---|
| 4,341,307 | 7/1982 | Shyers | 206/387.13 |
| 4,407,410 | 10/1983 | Graetz et al. | 206/387.13 |
| 4,428,481 | 1/1984 | Basili | 206/387.13 |
| 4,432,827 | 2/1984 | Graetz et al. | 156/245 |
| 4,555,290 | 11/1985 | Graetz et al. | 156/245 |
| 4,632,717 | 12/1986 | Graetz et al. | 156/245 |
| 4,717,021 | 1/1988 | Ditzig | 206/387.13 |
| 4,771,886 | 9/1988 | Johnson | 206/387.13 |
| 4,778,051 | 10/1988 | Schaub et al. | 206/387.13 |
| 4,966,283 | 10/1990 | Sykes et al. | 206/387.13 |
| 5,145,068 | 9/1992 | Schmitz et al. | 206/387.13 |
| 5,353,932 | 10/1994 | Kollinek | 206/387.13 |

Primary Examiner—Paul T. Sewell
Assistant Examiner—Luan K. Bui
Attorney, Agent, or Firm—Hill, Steadman & Simpson

[57] ABSTRACT

A new and improved book-style cassette holder is provided including a spine portion provided with stay-flat supporting features. The cassette holder includes a cover with front and rear flaps connected by a flexible spine portion. Complementary interfitting trays are provided on the inner faces of the flaps which may be stacked together in a closed position to define a cassette-receiving cavity. The spine portion is provided with a spine liner portion including number of raised protrusions which abut the tray portions in a closed position to maintain the spine portion in a taut condition. A series of spaced strut supports are defined between the protrusions which are effective to maintain the spine portion of the holder in an attractive, readable stay-flat condition in use.

15 Claims, 4 Drawing Sheets

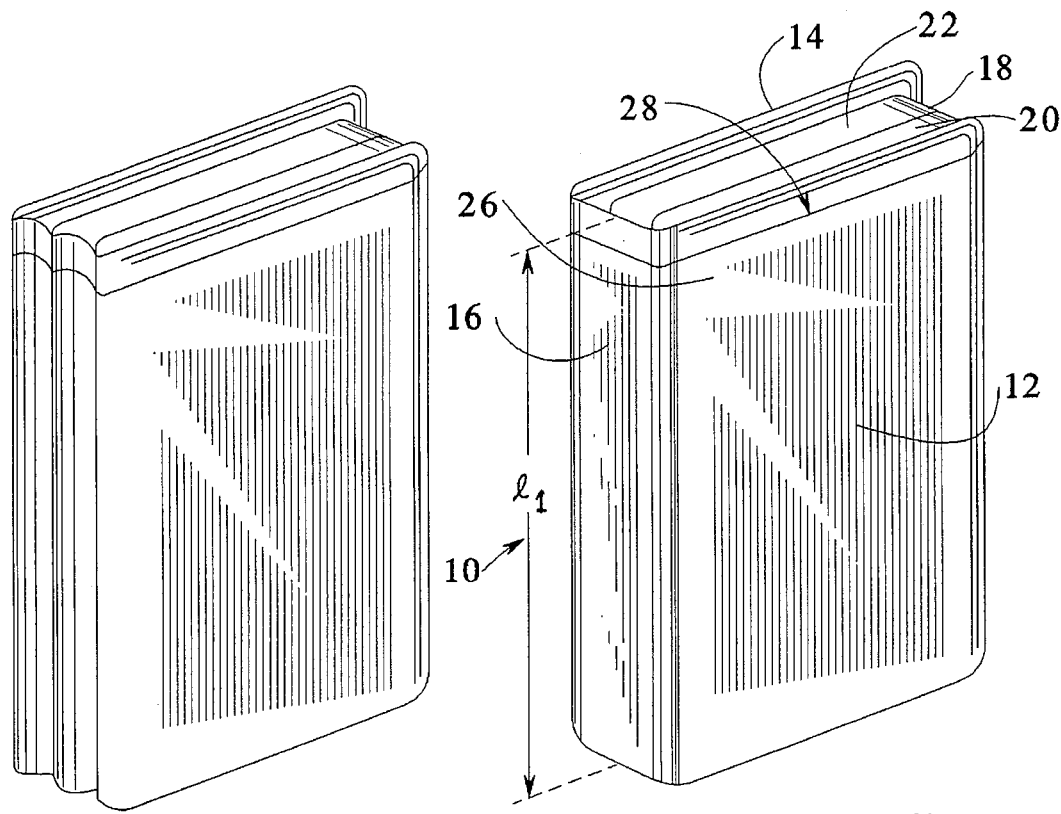
FIG.1 PRIOR ART  FIG.3
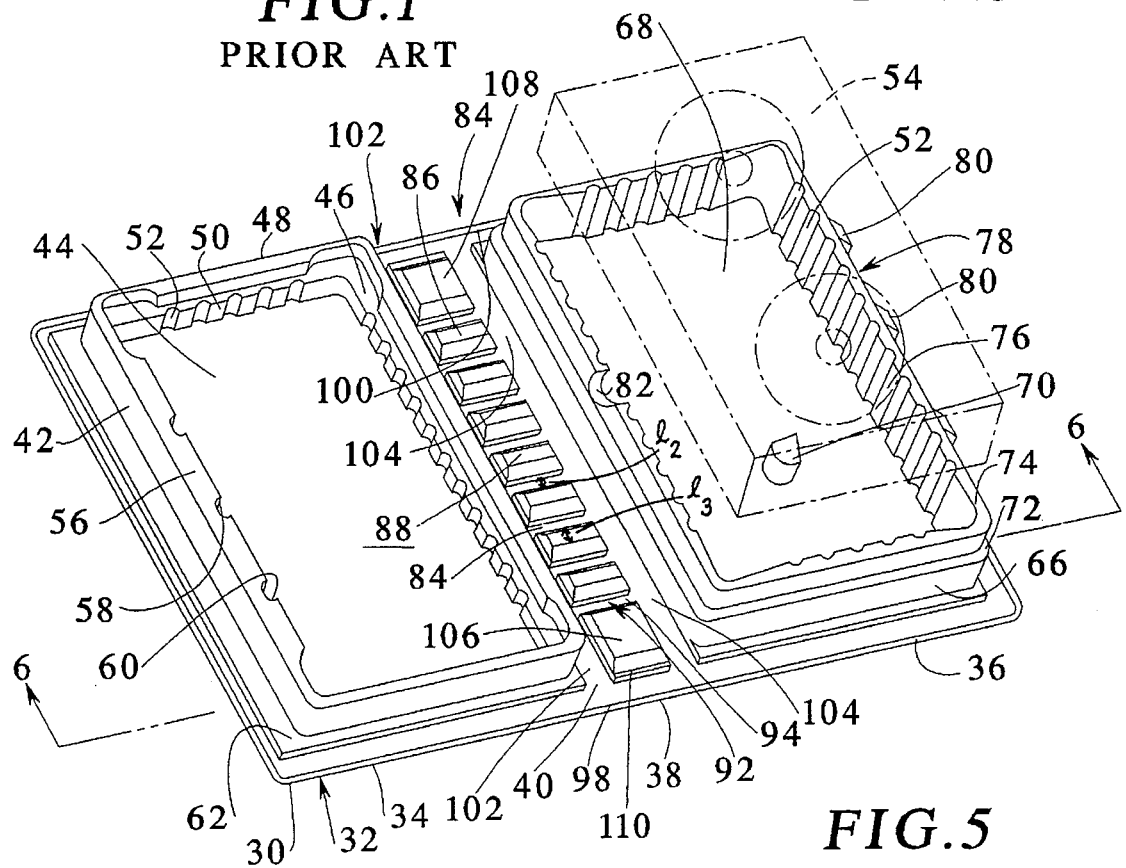
FIG.5

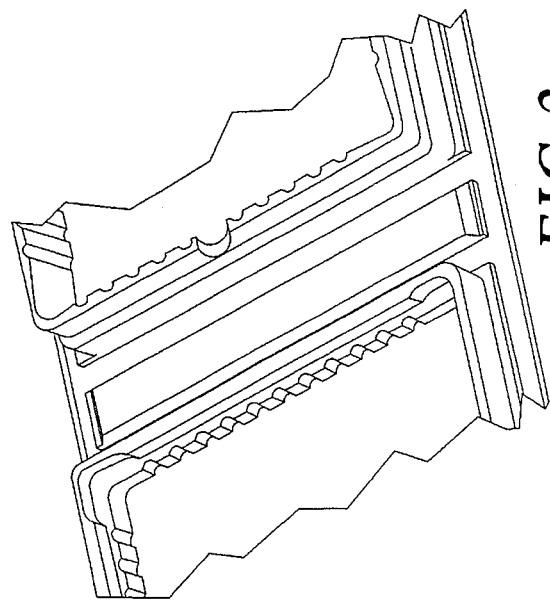
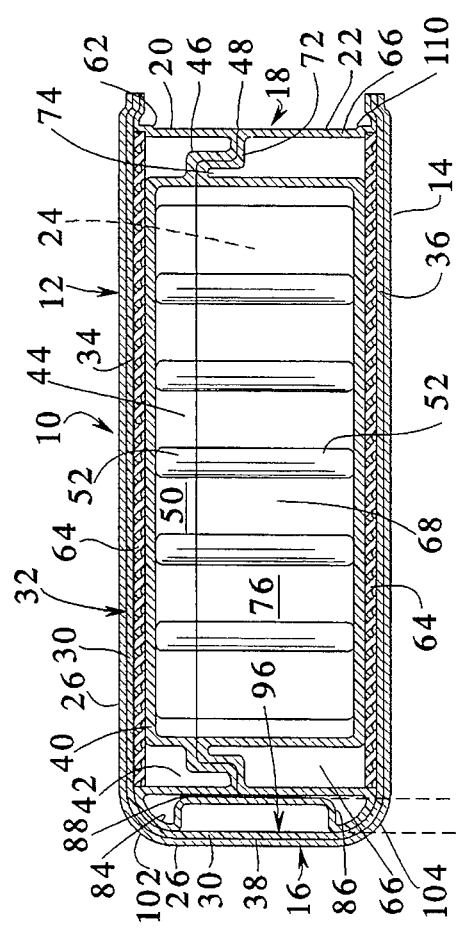

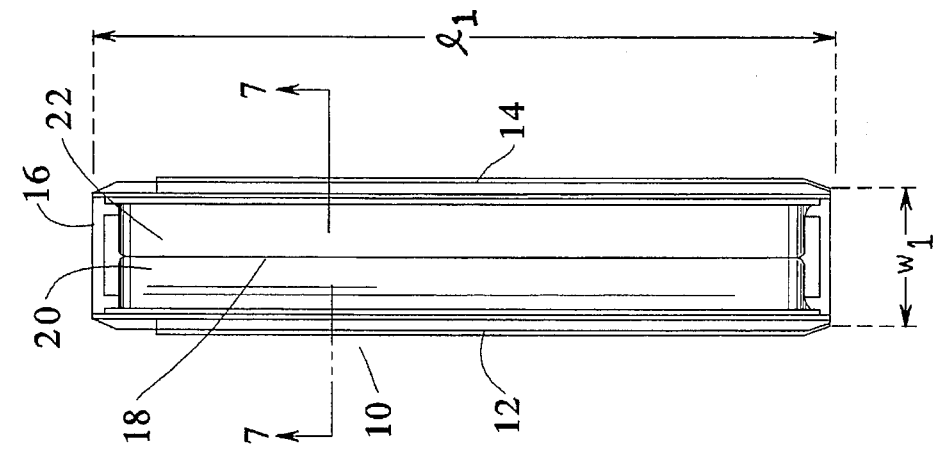
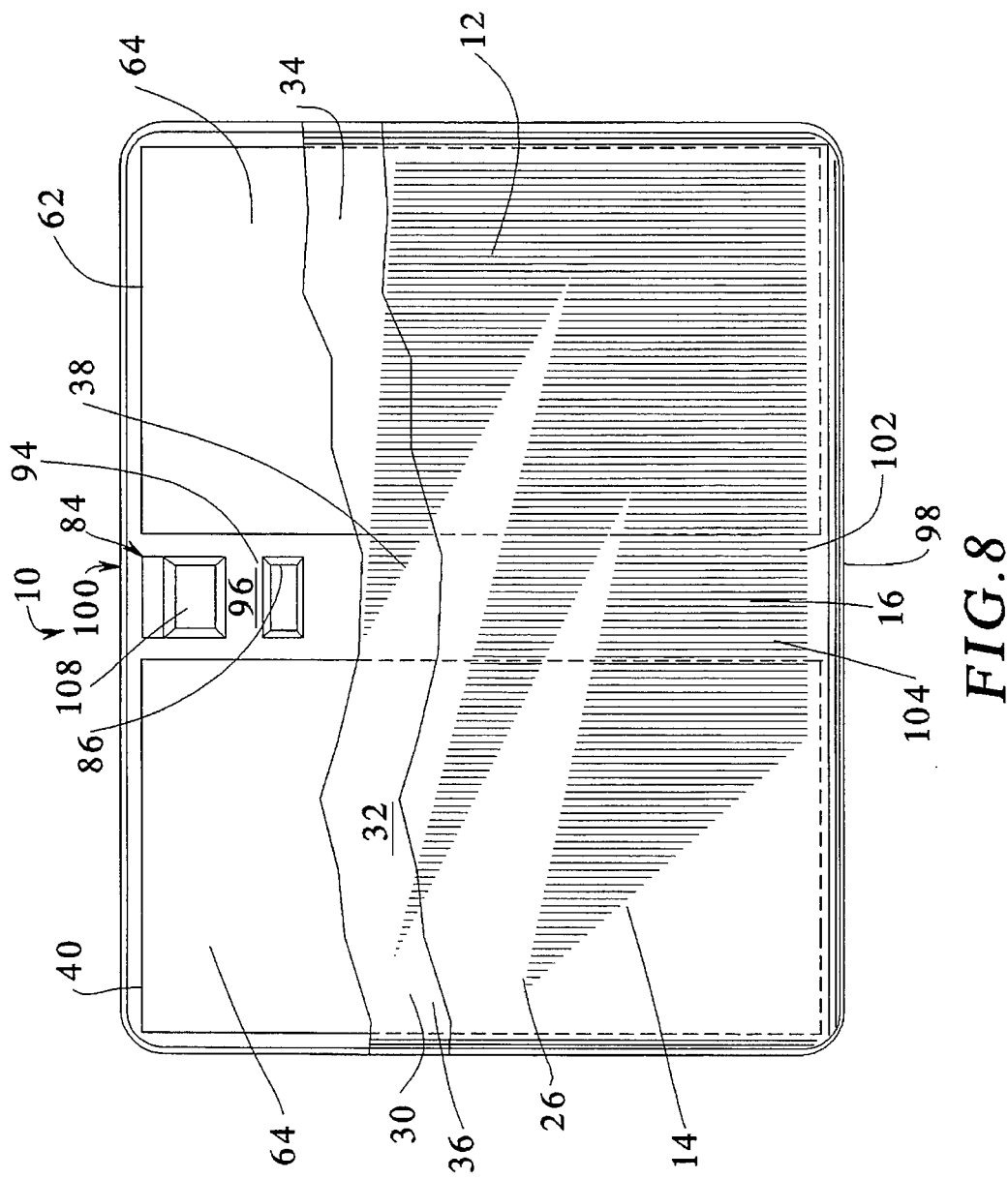

BOOK-STYLE CASSETTE HOLDER WITH STAY-FLAT SPINE PORTION

BACKGROUND OF THE INVENTION

The present invention generally relates to containers or holders for storing and carrying video tape cassettes, audiotape cassettes and the like. More particularly, it relates to a new and improved book-style cassette holder having a spine portion structured and configured to remain in a stay-flat, readable condition in use, even after repeated opening and closing of the holder.

Book-style cassette holders are known, for example, from U.S. Pat. No. 4,407,410 to Graetz, et al. In accordance with the cassette holder described in this patent, a reclosable book-style holder is formed by a multi-layer structure including an outer flexible sheet including front and rear flap portions separated by a spine portion and a second stiffer sheet of a vacuum-formed molded plastic material including a tray portion defined on each flap portion. The tray portions are formed by a hollow upstanding peripheral sidewall defining a central well area. The free ends of the sidewall defining each tray portion are provided with cooperating engageable features to maintain the holder in a closed position when the tray portions are brought together in a stacked, engaged position. In the closed position, the central wells of each tray portion cooperatively form a cassette-receiving cavity adapted to closely receive a cassette for protective carrying and storage. The flexible sheet and stiffer sheet are disposed in overlying relationship and the peripheral edges are bonded together. Stiffening panels may be provided between the tray portion and flap portion on the front and rear flaps to provide additional structural support.

In accordance with the cassette holder described in U.S. Pat. No. 4,407,410, the width of the spine portion is slightly larger than the combined stack tray height to cause an outward rounded bowing of the spine portion in the closed position of the cassette holder. An outer see-through film is bonded along three sides to the holder body to define an open topped pocket permitting printed labels to be interposed between the transparent sheet and flexible sheet to identify the cassette holder contents. Although the book-style cassette holder described in this patent functions quite well, the rounded or outwardly bowed spine portions are sometimes not easy to read unless viewed straight on from the front. In use, after repeated opening and closing of the holders, the web forming the spine portion may also become wrinkled, kinked or warped so that it does not bow outwardly, as shown in prior art FIG. 1, making the holders less attractive and considerably more difficult to read when arranged on a shelf, for example.

Accordingly, efforts to make flat spine bookstyle cassette holders ensued. In accordance with one major development, a flat spine portion is imparted by providing an elongate raised rectangular platform in the spine section of the molded stiff sheet member as shown in FIG. 2. The inwardly-facing raised distal surface of the rectangular platform bears against adjacent sidewall surfaces of the tray portions in a closed position of the holder to space the spine portion away from the stacked and closed trays, thereby stretching the spine portion into a taut flat condition. The raised rectangular platform is hollow and defines a recess on the inner facing surface of the molded sheet adjacent the outer spine portion of the flexible sheet. Repeated opening and closing of the modified cassette holder shown in FIG. 2 can also lead to stretching or sagging of the flexible sheet member. The spine portion, together with any label placed therealong, may deform inwardly into the recess defined by the raised rectangular-platform, which is unattractive and also provides for poor at-a-glance readability.

Prior efforts to overcome this deformation have included placing a stiffening sheet in between the spine portion of the flexible sheet and the raised rectangular platform of the spine portion of the molded sheet. The use of a spine stiffening insert is problematic because a separate spine stiffening sheet must be cut and properly positioned during manufacturing of the holder which undesirably increases the cost and complexity of manufacture.

Accordingly, it is an object of the present invention to provide a new and improved book-style cassette holder having a readable and attractive flat spine portion which is maintained in a stay-flat condition, after repeated opening and closing of the holder in use.

It is another object of the present invention to provide a new and improved book-style cassette holder provided with a stay-flat spine portion which is relatively easy and inexpensive to manufacture.

SUMMARY OF THE INVENTION

In accordance with these and other objects, the present invention provides a new and improved book-style cassette holder having a stay-flat spine. The cassette holder comprises a first one-piece flexible sheet including a front flap portion, a rear flap portion and a spine portion disposed between the flap portions and connecting the flap portions in laterally spaced, side-by-side relation. A second one-piece stiff molded sheet configured to overlie the flexible sheet is provided. The molded sheet includes a raised tray portion on an inner face of each flap portion of the flexible sheet and an integral spine liner portion between the tray portions, connecting the tray portions in laterally spaced, side-by-side relation and covering the spine portion of the first sheet.

The flexible sheet and molded sheet are secured together by a bond connecting the sheets around the peripheries thereof. The tray portions on the front and rear flap portions are complementary to stack together in a closed position of the holder to define an enclosed cassette-receiving cavity.

The spine liner portion of the molded sheet includes a plurality of raised protrusions separated by a plurality of intermediate depressions. The raised protrusions are positioned so that in a closed position of the holder, the raised distal surfaces on the raised protrusions abut adjacent surfaces on the tray portions of the front and rear flap portions to provide a taut flat spine portion on the closed holder. The depressions form a series of spaced struts which provide support surfaces which are effective to maintain the spine portion in a stay-flat condition upon repeated opening and closing of the holder in use. The new and improved cassette holders do not suffer from the inward or outward spine deformations experienced with prior art holders, and accordingly, maintain an attractive readable appearance.

In accordance with the invention, the supporting struts may run either horizontally or vertically along the spine portion to provide stay-flat support surfaces for the spine portion of the flexible sheet in use.

In an embodiment, the cassette holder further includes a flexible film overlying the flap and spine portions of the flexible sheet opposite the molded sheet which is bonded along three sides thereof to the periphery of the flexible sheet. The fourth side of the flexible film is free from the first sheet to define a pocket around the first sheet in which various printed labels may be inserted to identify the contents of the holder. The flexible film is preferably transparent and is configured so that it is tightened against the first sheet when the holder is moved to its closed position.

In an embodiment, the tray portions of the holder are provided with hollow upstanding peripheral sidewalls defining a central well area sized and shaped to closely, slidably receive a tape cassette. The free end surfaces of the peripheral sidewalls of the tray portions on the front and rear flaps are preferably provided with cooperative features such as complementary step shoulders permitting them to mate together in a cooperatively engaged or nested manner when moved to a stacked and closed position. Complementary pop-and-lock features provided by corresponding locking ridges and ridge-receiving recesses may be provided in the matable free end portions of the tray sidewalls to cooperatively, releasably maintain the holder in a closed position. The two tray portions on the front and rear flaps in a closed and engaged position define a cassette-receiving cavity adapted to receive a cassette member. In a preferred embodiment, the inwardly facing wall surfaces of the peripheral walls of the tray portions are preferably grooved or scalloped to prevent formation of a vacuum on insertion of a cassette to facilitate removal. In addition, a thumb access recess in at least one sidewall portion is also provided to provide easier gripping and removal of a stored cassette. Also in accordance with a preferred embodiment, each tray portion includes a peripheral step shoulder therein to define a support sheet receiving recess or area to permit flush mounting of a rigid reinforcing panel between each flap portion and its overlying tray portion to help rigidify the flaps and tray bottoms.

The new and improved book-style cassette holders in accordance with this invention do not require additional reinforcing sheets to be added to the spine portion of the holder but are able to provide and maintain a stay-flat spine portion without the need for extra parts, providing reduced costs and less complicated manufacture.

Other objects and advantages provided by the present invention will become apparent from the following Detailed Description of the Preferred Embodiments taken in conjunction with the Drawings, in which:

BRIEF DESCRIPTION OF THE DRAWINGS

FIG. 1 is a perspective view of a prior art book-style cassette holder showing one type of deformation of the spine which may occur in use;

FIG. 2 is a perspective fragmentary view of a prior art book-style cassette holder shown in an open face-up position;

FIG. 3 is a perspective view of the new and improved book-style cassette holder in accordance with the present invention including a strut supported lay-flat spine portion shown in a closed position;

FIG. 4 is an end elevation view of the new and improved book-style cassette holder in accordance with the present invention shown in the closed position;

FIG. 5 is a perspective view of the new and improved book-style cassette holder of the present invention in accordance with a preferred embodiment shown in an open, face-up condition adapted to storably receive a video tape cassette shown in phantom lines;

FIG. 6 is an elevated cross-sectional view of the new and improved book-style cassette holder in accordance with the present invention shown in an open condition and taken along view lines 6—6 in FIG. 5;

FIG. 7 is an elevated cross-sectional view of the new and improved book-style cassette holder of the invention in the closed position and taken along view lines 7—7 in FIG. 4;

FIG. 8 is an elevation view of the new and improved book-style cassette holder of the invention viewed from the front or public side, with portions of the first flexible sheet cut away to reveal details of its multi-layer construction;

DETAILED DESCRIPTION OF THE PREFERRED EMBODIMENTS

Figure 9:
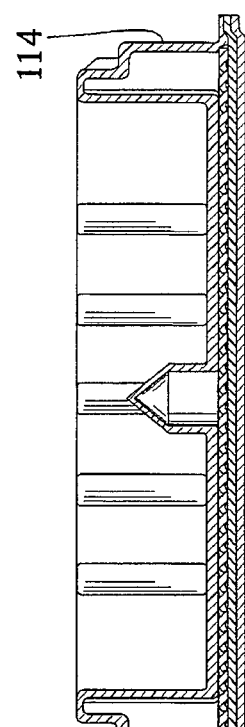
FIG. 9 is a fragmentary perspective view of a new and improved book-style cassette holder in accordance with an alternate embodiment.

Referring now to FIGS. 3–4, a new and improved book-style cassette holder in accordance with a preferred embodiment of this invention, generally referred to by reference numeral 10, is shown. As depicted in FIG. 3, cassette holder 10 in its closed position has a book-style body including a front flap or leaf 12, a rear flap or leaf 14, and a stay-flat spine 16. An open side 18 is disposed generally opposite spine 16. A pair of upstanding inwardly facing tray portions 20 and 22 are provided on inner facing surfaces of the front and rear flaps 12 and 14, respectively, which stack together in a matably engaged manner as shown in the closed position of FIG. 3 to define a cassette-receiving cavity 24 therein, shown in FIG. 7. In accordance with a preferred embodiment, cassette holder 10 further includes a flexible transparent film 26 bonded to the outside or public surface 32 of carrier 10 along three sides thereof. A top side of transparent film 26 is left open to define an outer sleeve or pocket 28 adapted to receive a label sheet for identifying the contents of cassette holder 10.

In greater detail and referring now to FIGS. 5–8, cassette holder 10 has a multi-layer construction comprising a first one-piece flexible sheet member 30 having an outwardly facing or public side surface 32. Flexible sheet 30 includes a front flap portion 34, a rear flap portion 36, and a spine portion 38. Spine portion 38 is disposed between flap portions 34 and 36 and connects them in laterally spaced, side-by-side relation.

Flexible sheet 30 may be any suitable flexible thermoplastic film or sheet material having a reasonable amount of toughness, tear resistance and flexibility in use. Preferably, flexible sheet 30 comprises an opaque colored or pigmented plasticized polyvinyl chloride (PVC) film or sheet having a thickness of from about 0.010 to about 0.014 inch.

Cassette holder 10 additionally comprises a second one-piece molded sheet member 40. Molded sheet 40 includes a first raised tray portion 20 overlying front flap portion 34 of flexible sheet 30 and a second raised tray portion 22 overlying rear flap portion 36. Tray portion 20 includes an upstanding peripheral sidewall 42 bounding and defining a rectangular central well area 44. An inward step shoulder 46 is defined in the upper free end 48 of sidewall 42. The upstanding interior wall surfaces 50 of peripheral sidewall 42 include a plurality of shallow grooves 52 defining a scalloped surface which prevent formation of a vacuum when tray portion 20 is received over a videotape cassette 54.

In accordance with the preferred embodiment, as is best shown in FIG. 5, a plurality of inwardly directed latch projections 56 are defined adjacent the upper end of the left side of peripheral sidewall 42 and provided with a slight undercut indicated at 58. Latch projections 56 are shown alternating with a plurality of spaced apart recesses 60. Tray portion 20, in accordance with a preferred embodiment, also includes an outwardly stepped shoulder 62 adjacent a lower end thereof adapted to locate or position a stiffening reinforcing sheet 64 of cardboard or the like as shown in FIGS. 6, 7 and 8.

Molded sheet 40 also includes a second tray portion 22 overlying rear flap portion 36. Tray portion 22 is similar in most respects to tray portion 20. Tray portion 22 also includes an upstanding peripheral sidewall 66 bounding and defining a rectangular central well area 68 which is preferably provided with an upstanding tapered tip cylindrical pin 70 positioned to be received in a hub portion of a tape cassette 54. An outwardly facing shoulder 72 is defined in the upper free end 74 of sidewall 66. The upstanding interior wall surfaces 76 of peripheral sidewall 66 also include grooves 52 as shown.

In accordance with the preferred embodiment best shown in FIGS. 5 and 6, a plurality of latch receiving depressions 78 are defined in an outwardly facing surface adjacent the upper end 24 of the right-hand side of peripheral sidewall 66, as shown. Raised ridges 80 alternate with depressions 78. In the closed position of the holder 10 as depicted in FIGS. 3 and 7, tray portions 20 and 22 stack together so that inward step shoulder 46 cooperatively mates with outward step shoulder 72, latch projections 56 are releasably engaged in depressions 78 and raised ridges 80 are received in recesses 60. Also as shown in FIG. 5, a generally semicircular recess 82 is provided in the upper end 74 of sidewall 66 on the left-hand side as shown in FIG. 5 to provide thumb or finger access to facilitate removal of a cassette tape 54 from central well area 68.

In the preferred embodiment shown in FIGS. 5, 6, 7 and 8, sidewall 66 also includes an outwardly stepped shoulder 84 adjacent a lower end thereof for locating and receiving a second reinforcing panel or cardboard sheet 64.

In accordance with the preferred embodiment, and as is best shown in FIG. 6, upstanding sidewall 42 on tray portion 20 has a height dimension, hi, which is smaller than the height dimension, $h_2$, of upstanding sidewall 66 on tray portion 22, although they may also be provided with equal height if desired.

In accordance with the present invention, molded sheet 40 also includes a spine liner portion 84. Spine liner portion 84 includes a plurality of raised upstanding rectangular protrusions 86. Protrusions 86 have an inwardly facing distal surface 88 having a generally rectangular configuration. A taper or chamfer section 90 is provided at the upper end of each protrusion. Alternating with protrusions 86 are a plurality of relative depressions 92 forming a series of spaced struts 94. Support surfaces 96 are provided on the side of struts 94 facing and contacting the first flexible sheet 30.

Spine liner portion 84 has a width dimension, $W_1$, defined between tray portions 20 and 22 as shown in FIG. 5 and a length dimension, $l_1$, extending normal to the width dimension and defined between a bottom edge 98 and a top edge 100. In accordance with the preferred embodiment, struts 94 run in a horizontal direction parallel to the width dimension of the spine liner portion 84 and extend along the length of the spine liner portion 84. In the preferred embodiment shown in FIG. 5, the length dimension, $l_2$, of each strut 94 is about one-half the length dimension, $l_3$, of the adjacent distal surfaces 88 on protrusions 86.

Spine liner portion 84 includes a pair of bendable fold lines 102 and 104 disposed intermediate to sidewall 42 and protrusions 86 and protrusions 86 and sidewall 66 extending the length, $l_1$, of the spine liner portion. In accordance with the preferred embodiment shown in FIG. 5, the endmost protrusions 106 and 108 are slightly larger than protrusions 86. End protrusions 106 and 108 are each provided with an outwardly stepped shoulder 110 adjacent the bottom edge 98 and top edge 100 to define a stiffening gusset for preventing inward curling deformation of the top and bottom edges 100 and 98 of the spine 16.

As shown in FIG. 7, in the closed position of holder 10, the raised distal surfaces 88 on protrusions 86, 104 and 106 abut adjacent surfaces of sidewalls 42 and 66 on tray portions 20 and 22, respectively. The height, $h_3$, of the protrusions is sufficient to hold the spine portion 38 on flexible sheet 30 outwardly from the tray portions providing a taut and flat condition to the spine portion 38. In accordance with the present invention, support surfaces 96 on struts 94 prevent any inward deformation of spine portion 38 and serve to maintain spine portion 38 in an attractive, readable stay-flat condition in use.

In accordance with the present invention, molded sheet member 40 is vacuum form molded from a one-piece sheet of thermoplastic material. In accordance with a preferred embodiment, molded sheet 40 comprises a relatively rigid non-plasticized polyvinyl chloride having a thickness of from about 0.15 to 0.20 inch. Although polyvinyl chloride is preferred, other moldable thermo-plastic sheet materials may also be used such as polyesters, polyamides and polyolefins, to name but a few generic types.

The new and improved book-style cassette holders 10 may be prepared by conventional assembly methods. The molded sheet member 40 is prepared. Reinforcing cardboard stiffening sheets 64 are positioned in the outer facing side of tray portions 20 and 22 resting on step shoulders 62. The first flexible sheet 30 is disposed over the cardboard reinforced molded sheet member 40 in registering overlying relationship. A flexible transparent film 26, if desired, may also be disposed in registering overlaying relation on the public side surface 32 of the first flexible sheet 30. Thereafter, the three peripheral edges of molded sheet 40, first flexible sheet 30, and transparent film 26 are securely bonded together to form the bottom and side edges of the cassette holder 10. The molded sheet 40 and first flexible sheet 30, are also securely bonded together to form top edges of the cassette holder 10. Bonding may be provided by any suitable securement means, however, adhesive bonding, ultrasonic welding or thermal bonding are preferred methods and thermal bonding is especially preferred.

The transparent flexible film 26 may also comprise any see-through thermoplastic material. However, a plasticized clear polyvinyl chloride is preferred.

Figure 10:
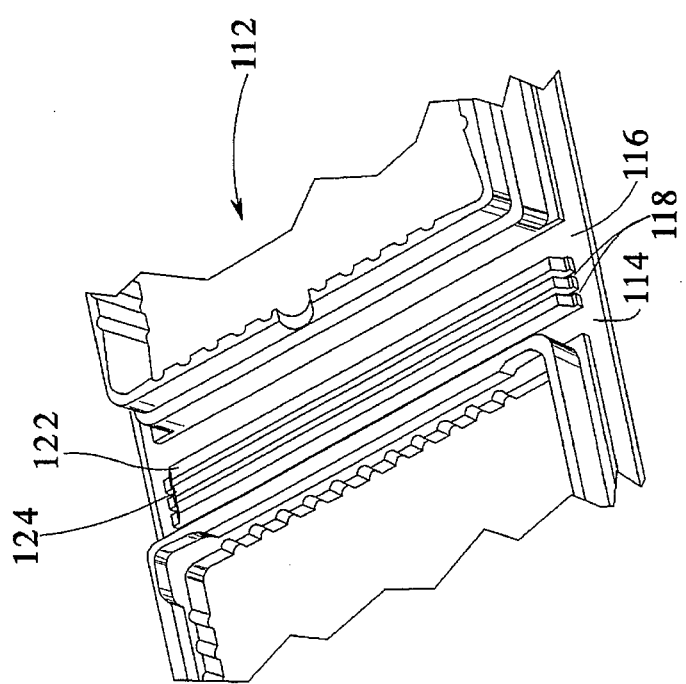
FIG. 10 is an elevated cross-sectional view of the book-style cassette holder in accordance with the alternate embodiment of FIG. 9 shown in its open condition.
Figure 11:
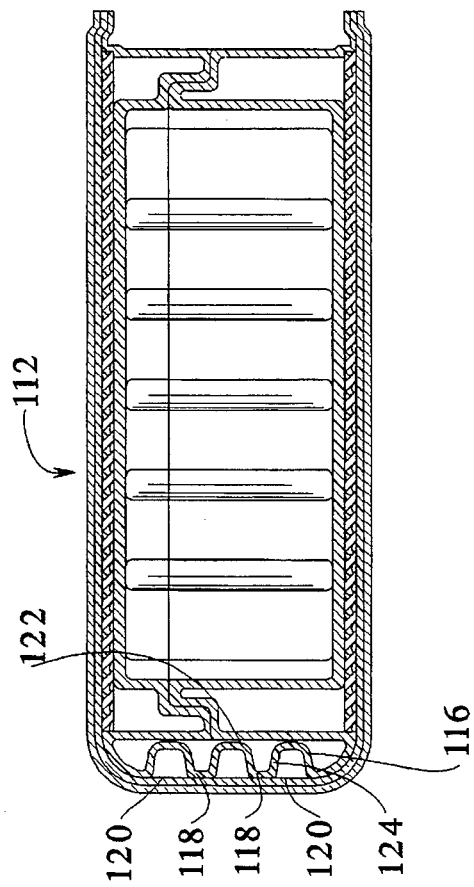
FIG. 11 is an elevated cross-sectional view of the book-style cassette holder shown in FIGS. 9—10 shown in its closed position.

Referring now to FIGS. 9–11, an alternate bookstyle cassette holder in accordance with the present invention, generally referred to by reference numeral 112, is shown. Cassette holder 112 is similar in most respects to cassette holder 10, except that cassette holder 112 includes a molded sheet member 114 having a spine liner portion 116 including a plurality of spaced apart struts 118 which run vertically along spine liner portion 116 generally parallel to the length, $l_1$, of the spine liner portion. Each strut 118 includes a support surface 120 thereon positioned to support the first flexible sheet 30 in a stay-flat condition. In the alternate embodiment depicted in FIGS. 9–11, the width, $w_2$, of each strut 118 is generally equal to the width, $w_3$, of the adjacent distal surfaces 122 on adjacent raised protrusions 124.

In accordance with the present invention, support surfaces 96 or 120 defined on the spaced apart strut members 94 or 118 maintain the spine portion 38 of book-style cassette holders 10 and 112 in a taut, stay-flat, and readable condition without the need for separate spine rigidifying panels previously required in the prior art.

Although the present invention has been described with reference to certain preferred embodiments, modifications or changes may be made therein by those skilled in the art. For example, instead of providing struts running along the spine portion in a horizontal or vertical direction, diagonal struts may also be used. Instead of using polyvinyl chloride sheets for sheets 26, 30 and 40, other thermoplastic sheets formed from like or different sheet materials may also be substituted. All such obvious modifications or changes may be made herein by those skilled in this art, without departing from the scope and spirit of the present invention as defined by the appended claims.

What is claimed is:

1. A book-style cassette holder comprising:

a first one-piece flexible sheet including a front flap portion, a rear flap portion and a spine portion disposed between the flap portions and connecting the flap portions in a laterally spaced, side-by-side relation;

a second one-piece stiff molded sheet having a raised tray portion on an inner face of each flap portion of said first sheet and an integral spine liner portion between the tray portions connecting the tray portions in a laterally spaced, side-by-side relation and covering the spine portion of the first sheet, a bond connecting said first and second sheets together around the peripheries thereof, the tray portions on the front and rear flap portions being complementary to stack together in a closed position of the holder to define an enclosed cassette-receiving cavity, said spine liner portion including a plurality of centrally disposed raised protrusions separated by a plurality of intermediate depressions, the raised protrusions being positioned so that in the closed position, raised distal surfaces on the raised protrusions abut adjacent surfaces on the tray portions of the front and rear flap portions to provide a taut and flat spine portion for the holder, and the depressions forming a series of spaced struts defining support surfaces that contact the spine portion of said first flexible sheet and are effected to maintain the spine portion in a stay-flat condition upon repeated opening and closing of the holder in use.

2. A book-style cassette holder as defined in claim 1, wherein said spine liner portion has a width dimension defined by the lateral distance between the tray portion on the front flap and the tray portion on the rear flap, and the length dimension extending normal to the width dimension.

3. A book-style cassette holder as defined in claim 2, wherein the struts run generally parallel to the length dimension.

4. A book-style cassette holder as defined in claim 2, wherein the struts run generally parallel to the width dimension.

5. A book-style cassette holder as defined in claim 4, wherein the distal surfaces of the protrusions have a substantially uniform length as measured in the length dimension direction and the struts have a substantially uniform length measured in the same direction of about one-half the length of the distal surfaces.

6. A book-style cassette holder as defined in claim 1, further comprising a flexible film overlying the flap and spine portions of said first sheet, and a bond sealing three sides of the flexible film to the periphery of said first sheet leaving a fourth side of the flexible film free from said first sheet and providing a pocket around said first sheet which is tightened against the first sheet when the holder is in its closed position.

7. A book-style cassette holder as defined in claim 1, including a separate rigid cardboard slab between each flap of said first sheet and each tray portion of said second sheet to rigidify the flaps and bottoms of the tray portions.

8. A book-style cassette holder as defined in claim 1, wherein each tray portion has a pocket under the bottom thereof and the rigid slab is bottomed in this pocket and covered by the first sheet.

9. A book-style cassette holder as defined in claim 1, wherein each tray portion has an upstanding hollow peripheral wall defining a central well area sized for snugly embracing a cassette inserted in the tray portion and the peripheral walls are complementary to cooperatively mate together in closed, stacked relation.

10. A book-style cassette holder as defined in claim 9, wherein the peripheral walls are hollow and each tray portion has a complementary stepped end wall fitting together in overlapped relation.

11. A book-style cassette holder as defined in claim 9, wherein inwardly facing surfaces on each upstanding peripheral wall include a plurality of spaced apart grooves defined therein to facilitate removal of a cassette from the central well portion of the tray.

12. A book-style cassette holder as defined in claim 6, wherein said flexible film is transparent to permit visual inspection of an insert placed in the pocket.

13. A book-style cassette holder as defined in claim 9, wherein at least one tray portion includes at least one curved recess defined in an upstanding sidewall to provide thumb access to a cassette loaded in the tray portion and facilitate removal thereof.

14. A book-style cassette holder as defined in claim 1, wherein said second sheet comprises a vacuum form molded sheet of polyvinyl chloride.

15. A book-style cassette holder comprising:

a first one-piece flexible sheet including a front flap portion, a rear flap portion and a spine portion disposed between the flap portions and connecting the flap portions in a laterally spaced, side-by-side relation;

a second one-piece stiff molded sheet having a raised tray portion on an inner face of each flap portion of said first sheet and an integral spine liner portion between the tray portions connecting the tray portions in a laterally spaced, side-by-side relation and covering the spine portion of the first sheet, a bond connecting said first and second sheets together around the peripheries thereof, the tray portions on the front and rear flap portions being complementary to stack together in a closed position of the holder to define an enclosed cassette-receiving cavity, said spine liner portion having a width dimension defined by the lateral distance between the tray portion on the front flap and the tray portion on the rear flap, and a length dimension extending normal to the width dimension, said spine liner portion further including a plurality of raised protrusions separated by a plurality of intermediate depressions, the raised protrusions being positioned so that in the closed position, raised distal surfaces on the raised protrusions abut adjacent surfaces on the tray portions of the front and rear flap portions to provide a taut and flat spine portion for the holder, and the depressions forming a series of spaced struts running generally parallel to said width dimension and being effective to maintain the spine portion in a stay-flat condition upon repeated opening and closing of the holder in use.

* * * * *